United States Patent [19]
Mercurio et al.

[11] 3,914,463
[45] Oct. 21, 1975

[54] METHOD OF PROTECTING SUBSTRATES WITH LIGHT-STABLE VARNISH OR LACQUER

[75] Inventors: Andrew Mercurio, Hatboro; Peter R. Sperry, Doylestown, both of Pa.

[73] Assignee: Rohm and Haas Company, Philadelphia, Pa.

[22] Filed: Dec. 15, 1972

[21] Appl. No.: 315,752

[52] U.S. Cl. .............................. 427/54; 21/7; 21/58; 260/43; 260/45.95; 260/84.4; 260/827; 260/838; 427/385; 427/397
[51] Int. Cl.² ........................................... B05D 3/06
[58] Field of Search......... 117/148, 62, 161 L; 21/7, 21/58; 260/826, 838, 829, 43, 84.4, 45.95

[56] References Cited
UNITED STATES PATENTS

| | | | |
|---|---|---|---|
| 2,270,959 | 1/1947 | Murke et al. | 260/43 |
| 2,384,947 | 9/1945 | Matheson | 260/43 |
| 2,433,062 | 12/1947 | Pfeffer | 260/43 |
| 3,020,259 | 2/1962 | Schulde et al. | 260/45.95 |
| 3,288,880 | 11/1966 | Tocker | 260/828 |
| 3,294,862 | 12/1966 | Prochaska | 260/829 |
| 3,297,478 | 1/1967 | Larsen | 117/232 |
| 3,330,884 | 7/1967 | Tocker | 117/161 L |
| 3,444,129 | 5/1969 | Young et al. | 260/47 |
| 3,460,961 | 8/1969 | Young et al. | 117/76 |
| 3,492,261 | 1/1970 | Young et al. | 117/148 |
| 3,503,779 | 3/1970 | Young et al. | 117/148 |
| 3,506,470 | 4/1970 | Young et al. | 117/333 |
| 3,650,799 | 3/1972 | Young et al. | 117/148 |

FOREIGN PATENTS OR APPLICATIONS

| | | | |
|---|---|---|---|
| 653,955 | 12/1962 | Canada | 427/397 |
| 153,554 | 10/1962 | U.S.S.R. | 427/393 |
| 1,219,211 | 6/1966 | Germany | 427/393 |
| 804,671 | 11/1958 | United Kingdom | 427/393 |
| 522,820 | 3/1956 | Canada | 427/393 |

OTHER PUBLICATIONS

35 Chem. Abstract, 9186–Resins in Nitrocellulose Lacquers, by Breuker.
57 Chem. Abstracts 11408e, Adhesives & Lacquer Etc., by Shoygina et al.
54 Chem. Abstracts 12613j–Esterification of Epoxyresins, by Gliwice.
69 Chem. Abstracts 79681h–Stoving Varnish, by Heinz.
48 Chem. Abstracts 6142c–Acrylic Resins in the Lacquer & Adhesive Ind., by Roigheim et al.

*Primary Examiner*—William R. Trenor

[57] ABSTRACT

Disclosed is a process for coating a substrate with a transparent, weather-resistant, light-stable exterior varnish or lacquer comprising blending a transparent coating resin free of drying types of unsaturation, and free of chlorine and bromine, and a minor amount of a compatible transparent, uncured, unoxidized, water-insoluble linear condensation resin of formaldehyde and a phenol having the formula:

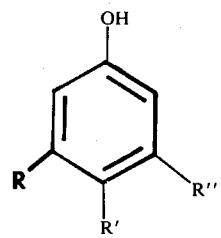

wherein R' is a radical selected from the group consisting of alkyl, substituted alkyl, cycloalkyl, substituted cycloalkyl, aryl, and substituted aryl, and R and R'' are radicals taken from said group or H, the methylene groups in the condensation resin being in the ortho, ortho' position with respect to the hydroxy group, applying a thin coating of the transparent composition to a substrate, and exposing said coating to conditions, for instance outdoor exposure and/or an oxidation catalyst such as the metallic driers commonly used with unsaturated drying oils, such that oxidation of the phenolaldehyde condensate is achieved to an extent that at least some of the ortho, ortho' —CH₂— groups connected to phenol rings are converted to

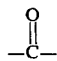

groups, whereby the oxidized phenol-aldehyde condensate protects the coating resin and substrate from oxidation or degradation induced by actinic light or other means, the amount of condensation resin being from 5 percent to 35 percent, preferably 10 to 30 percent, based on the combined weights of the resins.

The phenol-aldehyde resin may be oxidized prior to being introduced into a coating resin, or it may be oxidized while mixed with the coating resin when it is in liquid form, as an aqueous dispersion, organic solvent solution, or non-aqueous dispersion of the polymer.

9 Claims, No Drawings

METHOD OF PROTECTING SUBSTRATES WITH LIGHT-STABLE VARNISH OR LACQUER

This invention relates to light-stable exterior varnish or lacquer compositions containing a coating resin and the provision of an oxidized water-insoluble linear condensation resin of formaldehyde and a phenol, the methylene groups between the rings of the phenolic moiety of the resin being attached thereto in positions ortho to the hydroxyl group. When oxidized, some of the methylene groups annexed to the phenol groups are converted to carbonyl groups. The oxidized phenol-formaldehyde condensate stabilizes the coating resin and the underlying surface such as wood from the deleterious effects of actinic light, particularly sunlight.

A common type of varnish long used is the combination of a drying oil-modified alkyd and phenol-formaldehyde resins. These varnishes are considered excellent if they give an outdoor life of one year. Apparently, the alkyd resin is oxidized and embrittles, particularly adjacent the substrate such as wood. On further weathering, either the wood is damaged or the drying oil-modified alkyd is damaged, or both, which causes cracking, dulling, peeling or flaking of the varnish layer. It has even been proposed to add ultraviolet absorbers to such varnishes to increase the life thereof. With the cost of common absorbers such as benzophenone and others running into dollars per pound, they have to be extremely effective in minute quantities in order to be economically feasible. Even then, it is not uncommon for such varnishes to fail to last even one year.

In accordance with the present invention, it has been found, surprisingly, that when any common coating resin which is free of the drying type of unsaturation found in oil-modified alkyds, and is free of chlorine and/or bromine, is combined with the specified phenol-formaldehyde resin, and the transparent coating is exposed to sunlight and oxygen, or other means, to provide oxidation of the methylene groups between aryl rings, they are converted to carbonyl groups and the resulting structure provides an ultraviolet screening material which prevents damage to the coating resin and substrate by actinic light.

One way of accomplishing this is to blend a transparent coating resin free of this specified halides and free of drying types of unsaturation and a minor amount of a compatible transparent, uncured, unoxidized, water-insoluble linear condensation resin of formaldehyde optionally with the inclusion of another aldehyde such as acetaldehyde, propional, or furfural, and a phenol having the formula:

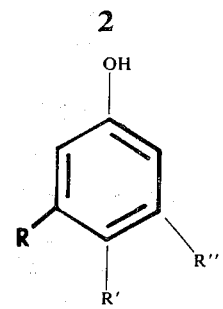

wherein R' is a radical selected from the group consisting of alkyl, substituted alkyl, cycloalkyl, substituted cycloalkyl, aryl, and substituted aryl, and R and R'' are radicals taken from said group, halogen or H, the methylene groups in the condensation resin being in the ortho, ortho' position with respect to the hydroxyl group, applying a thin coating of the transparent composition to a substrate, and exposing said coating to conditions such that oxidation of the phenol-formaldehyde condensate is achieved to an extent such that at least some of the —CH$_2$— groups connected to phenol rings are converted to

groups, for instance by exposure to sunlight, whereby the oxidized phenol-formaldehyde condensate protects the coating resin and substrate from oxidation or degradation induced by actinic light or other means, the amount of condensation resin being from 5 percent to 35 percent or more, preferably from 10 percent to 30 percent based on the combined weights of the resins.

The consequent structure of the oxidized phenol-formaldehyde resin is represented by the following:

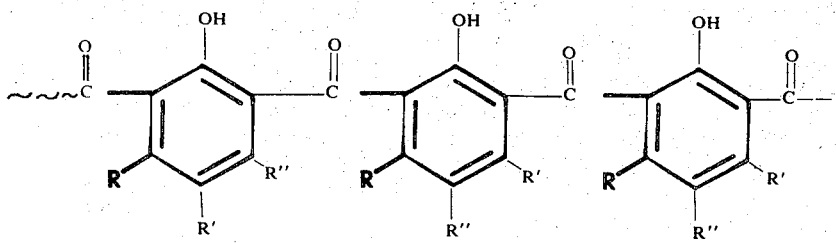

Of course, only a fraction of the methylene groups need be oxidized to carbonyl groups to offer effective protection to the substrate. The end groups can be:

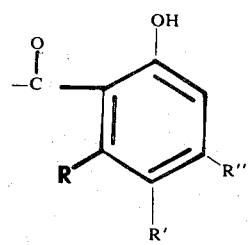

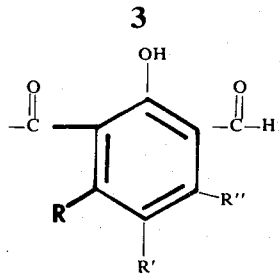

or

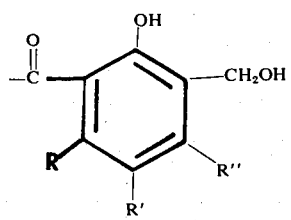

depending on the ratios of phenol to aldehyde and extent of oxidation. Preferably an excess of formaldehyde is used in preparing the resin.

Another method is to preoxidize the phenol-formaldehyde resin, for example, by heating it in an oven with oxidation catalysts, preferably the metallic driers such as the linoleates or naphthenates of Co, Mn, Ce, Pb, Cr, Fe, Ni, U, or Zn. In some cases, the acetates, borates, or oxalates of these metals are useful. Still another way of achieving the invention is to incorporate the drier into the coating resin solution or dispersion and cause oxidation of the phenol-formaldehyde to proceed while the composition is in liquid form, or after coating the substrate. Calculated on a metal basis, the amounts of drier used, based on total coating composition polymers, are from 0.01 to 1 percent, preferably 0.05 to 0.2 percent, weight basis. With preoxidation of the condensation polymer, amounts in the lower ends of these ranges are adequate.

In the above formula, when R, R', and/or R'' are alkyl or cycloalkyl or substituted derivatives thereof, they have from 1 to about 20 carbon atoms, preferably 3 to 10 carbon atoms. The long chain alkyl groups act as plasticizers, and the branched short chain alkyls have the opposite effect and make the product more rigid. Where R, R', and/or R'' is aryl, phenyl and alkyl-substituted phenyl groups are preferred. Substituents on the radicals R, R', and/or R'' may be —NH$_2$, NH(CH$_3$), —N(CH$_3$)$_2$, —OH, —OCH$_3$, halogen, —OC$_2$H$_5$, —NHCOCH$_3$, —C$_6$H$_5$, —CH$_3$, —N(CH$_3$)$_3{}^+$, —NO$_2$, —CN, —SO$_3$H, —COOH, —COOCH$_3$, —CHO, and/or —COR.

In general, the most preferred embodiment of the invention is the case in which the phenol is a para-alkyl phenol in which the alkyl group has from about 3 to about 10 carbon atoms. When the alkyl group is a higher alkyl such as octyl, it exerts a diluting effect upon the phenol-formaldehyde component, and generally more of it is required on a weight basis to achieve the same effect as required when the substitutent is a lower alkyl such as methyl or ethyl.

One reason the alkyl substituent is preferred is that when R and R'' are H and R' is phenyl, in addition to developing a strong yellow color upon oxidation of the phenolformaldehyde, the coating tends to become more brittle, requiring higher levels of plasticizing monomers or an external plasticizer. Of course, yellowness is not objectionable in some cases.

Useful phenols, for example, are those which have ethyl, propyl, n-butyl, t-butyl, sec-butyl, isobutyl, amyl, t-amyl, phenyl, octyl, pentadecyl, and the like, in the meta and para positions relative to the hydroxyl group. It is preferred that R and R'' be H and R' be a straight chain or branched chain alkyl radical, preferably having from 3 to 10 carbon atoms.

By a "clear" or "transparent" coating is meant one which transmits visible light to an extent that characteristics of the substrate such as the grain of wood are visible through the coatings. This does not preclude the use of dyes or pigments in tinting amounts as is common in the varnish industry.

Other aldehydes, though of no particular benefit, are useful with the essential formaldehyde. Thus, saturated or unsaturated open chain or alicyclic aldehydes having from 1 to about 5 carbon atoms are useful. In addition to those named above, butyraldehyde, n-pentanal, and the like are useful. While much of the discussion herein refers to "phenolformaldehyde," it is to be understood that the substituted phenols are meant and that the same considerations apply as to the inclusion of other aldehydes.

Suitable condensates of the substituted phenols and the aldehyde have number average molecular weights from about 300 to about 10,000, the mole ratio of phenol to aldehyde is from about 1:0.8 to 1:8. They are either "reactive" (alkali catalyzed condensation) or "nonreactive" (acid catalyzed condensation), and they are prepared by conventional methods.

The phenol-formaldehyde resin is soluble in most of the organic liquids which would be used for solvent solutions and for non-aqueous dispersions (NADs), or can be dispersed therein. In aqueous systems, the phenol-formaldehyde condensate has created some problems in dispersing the same. One way to do this is the mix the phenol-formaldehyde resin with a solvent which is immiscible in water, add a soap, and mechanically emulsify the composition. In such cases, suitable solvents are any of the volatile organic liquids mentioned herein, for example, those which are solvents for the coating resin. Others, which function as a solvent for the phenolformaldehyde resin and which also function as plasticizers for the coating resin, are useful. These may be either fugitive plasticizers which evaporate from the coating after it is deposited or may be permanent. Examples of fugitive plasticizers include the monoethyl or monomethyl ether of diethylene glycol, isophorone, benzylalcohol, 3-methoxybutanol, 2-butoxyethanol, and so forth. Examples of relatively permanent plasticizers are benzylbutyl phthalate, dibutyl phthalate, dimethyl phthalate, triphenyl phosphate, butylcyclohexyl phthalate, poly(propylene adipate)-dibenzoate, tricresyl phosphate, and the like. Suitable alternative solvents for the condensation resin include mineral thinner, aromatic petroleum hydrocarbons, toluene, acetone, ether, ethyl acetate, ethylene dichloride, and so on. A particularly useful material is 2-butoxyethanol, which when used with particular phenolic resins such as that derived from p-tertiary butyl phenol and formaldehyde, provides self-emulsification.

Any common method may be used for applying the liquid solution or dispersion of the coating resin and phenolformaldehyde resin.

Various solvents may be employed in applying the coating (if not applied as a latex or a nonaqueous dispersion), such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, 2-butoxyethyl acetate, 2-ethoxyethanol, 2-ethoxyethyl acetate, furfural, cyclohexane, hexane, aromatic hydrocarbon mixtures, such as Solvesso 150, and also various aliphatic, naphthenic and aromatic naphthas such as petroleum naphtha boiling in the range of about 87° to about 145° C. Mixtures of such solvents are generally useful.

Among the conventional coating resins which may be modified by the ultraviolet light screening material of the invention are the alkyds including the nondrying alkyds; cellulose esters such as cellulose acetate butyrate, cellulose acetate, and cellulose acetate propionate; nylons such as shown in U.S. Pat. No. 3,449,299, nylon 11 and nylon 12; epoxies such as the epoxy acrylates; polysulfides, acetal polymers, polycarbonates, such as prepared from phosgene and bis(monohydroxyarylene)alkanes, for example as taught by U.S. Pat. No. 3,169,121, polysulfones, polyimides, silicones such as the polymer having repeating dimethylsilicone units; polyolefins such as polyethylene, polystyrene, and polypropylene; hard or soft acrylics such as copolymers of methyl methacrylate with another acrylic acid or methacrylic acid ester, and optionally, up to 50 percent of one of the other vinyl monomers mentioned herein; polyhalo-olefins such as polyvinyl fluoride and polyvinylidene fluoride; copolymers of vinyl fluroide with vinyl acetate, vinylidene fluoride, and/or vinyl butyral; polyesters such as polyethylene terephthalate or the unsaturated polyester derived from maleic anhydride, phthalic anhydride, and ethylene glycol such polymers reacted with styrene; and so forth. Preferred are polymers and copolymers from vinyl monomers. The coating resins are well known, the present invention being to modify them with the ultraviolet screening material of the invention.

The term "vinyl monomer" as used herein means a monomer preferably having less than about 20 carbon atoms comprising at least one of the following olefinically unsaturated groups:

| vinylidene | $CH_2=C<$, |
| vinyl | $CH_2=CH-$, and |
| vinylene (not in an aryl ring) | $-CH=CH-$, | whether homopolymerizable by addition polymerization or not. Examples are the $\alpha,\beta$-ethylenically unsaturated monocarboxylic acids and esters and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenically unsaturated nitriles, hydrocarbons such as $\alpha$-olefins, conjugated diolefins, vinylaryl compounds, vinyl alkyl ethers, vinyl fluoride, vinylidene fluoride, vinyl sulfides, vinyl acyloxy compounds (esters of saturated carboxylic acids and ethylenically unsaturated alkanols), vinyl amines and salts thereof, alkenyl guanamines, vinyl ureido monomers, vinyl compounds having heterocyclic nitrogen-containing (HN<) groups, and hydroxyalkyl, or aminoalkyl substituted derivatives thereof. The methods for the preparation of the aqueous dispersions, solution polymers, or NADs of vinyl polymers are conventional and form no part of the present invention, and any known method may be used in accordance with the present invention. For examples of well-known methods of preparing vinyl polymers, see "Polymer Processes," Schildknecht, Interscience, N.Y. (1956), pp. 111–174. Mixtures of different polymer dispersions are useful, as are aqueous dispersions prepared by first polymerizing in solution in an organic solvent, then dispersing the material in an aqueous medium. Of course, the polymers may be prepared by mass or solution polymerization or by other methods.

For the purposes of this application, the term "vinyl monomers" and the term "coating resins" exclude those which contain bromine or chlorine such as vinyl chloride and vinylidene chloride, and includes fluorine containing compounds such as vinyl fluoride, particularly when copolymerized with vinyl monomers. The chlorine and bromine containing vinyl monomers result in polymers which are quite susceptible to attack by all sorts of media, particularly outdoor exposure, resulting in the loss of chlorine atoms, in a form such as hydrochloric acid, which may then result in a carbon-to-carbon double bond, which is further subject to attack by free-radicals and may result in a proliferating destruction of the film coating, particularly when exposed to air and sunlight.

Specific examples of suitable vinyl monomers which may be homopolymerized, or more preferably, copolymerized for use according to the invention are acrylic acid, methyacrylic acid, itaconic acid, maleic acid, fumaric acid, esters and half esters thereof with alkanols having 1 to 20 carbon atoms, such as methanol, ethanol, butanol, pentadecanol, and the like, and amides and half amides thereof with ammonia or organic amines, acrolein, methacrolein, acrylonitrile, methacrylonitrile, ethylene, propylene, isobutene, butadiene, isoprene, styrene, vinyltoluene, vinyl methyl ether, vinyl isobutyl ether, vinyl fluoride, vinylidene fluoride, vinyl sulfide, vinyl acetate, vinyl propionate, the vinyl pyridines, primary amino compounds such as $\beta$-amino ether vinyl ether, aminopentyl vinyl ether, secondary amino-containing compounds such as secondary amyl t-butyl aminoethyl methacrylate, tertiary amino-containing compounds such as t-dimethylaminoethyl methacrylate, and the allied amine salts such as the hydroxide, ureido monomers such as are disclosed in U.S. Pat. Nos. 2,881,155 to Hankins, 3,300,429 to Glavis and Keighly, and 3,356,627 to Scott, examples being $\beta$-ureidoethyl acrylate, $\beta$-(N,N'-ethyleneureido)ethyl acid maleate, $\beta$-ureidoethyl vinyl ether, N-vinyl-N,N'-ethyleneurea, N-vinyloxyethyl-N,N'-ethyleneurea, N-methacrylamidomethyl-N,N'-ethyleneurea, and N-dimethylaminoethyl-N'vinyl-N,N'-ethyleneurea, 2-($\Omega$-alkenyl)quanamines such as 4-pentenoguanamine, $\beta$-hydroxyethyl methacrylate, n-hydroxyethylacrylamide, N-methylolacrylamide, N-methylolmethacrylamide, and N-(dimethylaminoethyl)acrylamide. Homopolymers, copolymers, and graft, block, or segmented polymers are included.

Others include the aminoalkyl vinyl ethers and sulfides, aminoalkyl acrylates and methacrylates, N-aminoalkyl acrylamides or methacrylamides, hydroxyalkyl vinyl ethers or sulfides, and hydroxyalkyl acrylates and methacrylates. Specific monomers of this type include β-aminoethyl vinyl ether and sulfide, β-amino ethyl acrylate and methacrylate, N-β-aminoethyl acrylamide and N-β-aminoethyl methacrylamide, and β-hydroxypropyl acrylate and methacrylate.

Preferred comonomers for making the copolymers include acrylic acid, methacrylic acid, the nitriles thereof, the esters thereof with a saturated aliphatic alcohol having 1 to 18 carbon atoms, acrylamide, methacrylamide, the N-methylol derivatives of these amides, itaconic acid, vinyl acetate, and vinylaromatic hydrocarbons, especially styrene, and o-, m-, and p-vinyltoluene.

Representative specific coating resins within the foregoing classes will now be described.

Cellulose acetate butyrate is representative of the cellulose esters. It preferably has 16 to 40 percent of the hydroxyl groups in a glucose unit esterified with butyric acid and from 10 to 30 percent of such hydroxyl groups esterified by acetic acid. In the following specification, this is referred to as a cellulose acetate butyrate containing 16 to 40 percent butyryl and 10 to 30 percent acetyl. For some uses it is preferred that this ester contains 24 to 28 percent butyryl and 19 to 22 percent acetyl. If the butyryl content is too high, it has been found that the compositions are too tacky for certain uses. On the other hand, when the butyryl content is too low, the coating has insufficient elasticity. In other uses, as in the cases where no flexing occurs, a cellulose acetate butyrate, having 12 to 14 percent acetyl and 35 to 39 percent butyryl, and a degree of substitution of about 2.7 is perfectly satisfactory.

Substantially any compatible acrylic coating resin having a Ti of from about 60° C. to about −20° C. or lower, preferably at least about 0° C., is useful according to the invention. The "Ti" referred to is the transition temperature or inflection temperature which is found by plotting the modulus of rigidity against temperature by a method such as is described in British Plastics, 23, 87–90, 102 (September, 1950), determined at 300 kg./cm.². The hard acrylic monomers, those which when homopolymerized give a high Ti, include the lower alkyl ($C_1$-$C_4$) methacrylates, the higher alkyl ($C_{14}$-$C_{20}$) acrylates, acrylic acid, methacrylic acid, itaconic acid, tert-amyl methacrylate, cyclohexyl acrylate or methacrylate, tertiary butyl acrylte, isobornyl methacrylate, benzyl acrylate and phenoxyethyl methacrylate. The soft acrylic or other monomers, or those which when homopolymerized give a low Ti, include the higher ($C_5$-$C_{15}$) methacrylates, the lower alkyl ($C_1$-$C_{13}$ alkyl) esters of acrylic acid, ethyl thiaethyl methacrylate, and others, all as is more particularly described in U.S. Pat. Nos. 3,020,178; 2,972,592; and 2,795,564. As is known in the art, chain branching affects the Ti; the greater the branching the higher the Ti, in general. All or part of the hard acrylic monomer may be replaced by other ethylenically unsaturated had monomers such as styrene, vinyltoluene, acrylonitrile, methacrylonitrile, or vinyl acetate. Blends of hard and soft monomers are useful in accordance with known procedures to give the desired Ti. Functional adhesion promoting monomers, including α,β-unsaturated carboxylic acids, such as acrylic acid, methacrylic acid, itaconic acid, aconitic acid, maleic acid, half esters of the dicarboxylic acids such as maleic acid, fumaric acid, the dimer or trimer of methacrylic acid, acrylamides such as acrylamide, methacrylamide, N-methylolacrylamide, N-methacrylamide, and N-ethylolacrylamide, are permissible in the coating resin.

These polymers and the other coating polymers are well known to the art. While most of the coating resins described heretofore are thermoplastic, thermosetting resins such as the aminoplast-modified, non-drying alkyds, acrylics, and others are useful.

Representative crosslinkable coating resins will now be described.

The coating resin may be thermosetting, i.e., be subject to latent crosslinking. Such polymers are made with monomers which contain reactive groups capable of reacting with themselves or with other groups present in the polymer chain to impart crosslinking during heating or fusion of the coating. Where addition polymers are involved, monomers which are suitable for this function include certain acrylics having crosslinkable functionality exemplified by the following: acrylic acid; methacrylic acid; acrylamide; methacrylamide; epoxyalkyl acrylates or methacrylates, e.g., glycidyl methacrylate; monoacrylic acid esters of glycols; hydroxyalkyl acrylates or methacrylates, isocyanatoalkyl acrylates and aminoalkyl acrylates or methacrylates, as well as other compounds described below.

Examples of the latent crosslinking reactions which are possible using heat and/or catalysis are:

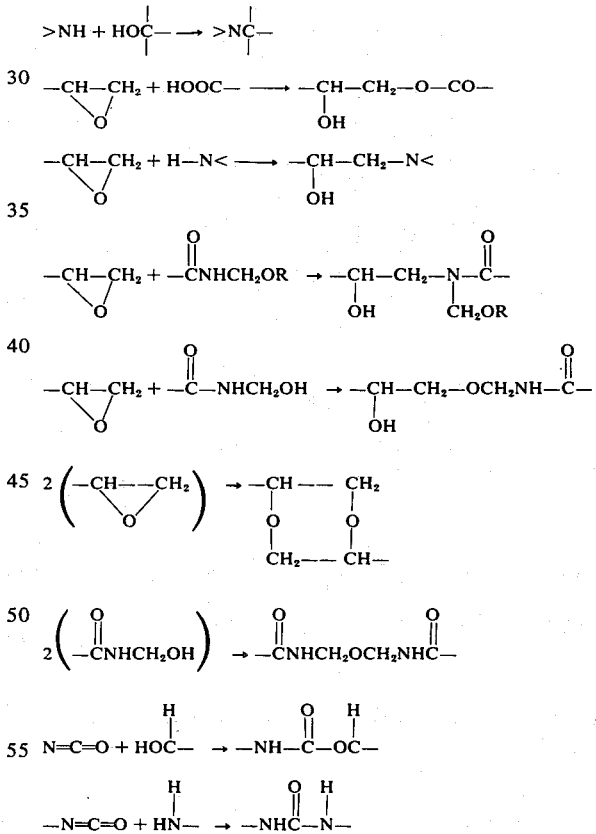

Addition polymerizable unsaturated monomers containing such groups are well known in the art, examples being isocyanates such as isocyanatoethyl methacrylate, epoxy compounds such as glycidyl methacrylate, aminoalkyl compounds such as methylaminoethyl methacrylate, and t-butylaminoethyl methacrylate, amides such as methacrylamide, guanamines such as 4-pentenoguanamine, hydroxyalkyl esters such as hydroxypropyl methacrylate and hydroxyethyl methacrylate, nitriles such as methacrylonitrile, N-alkoxyalkyl amides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

As may be seen, the latently crosslinkable addition polymerizable unsaturated monomers have reactive polar groups selected from those including —OH, —SH, >NH,

—N=C=O, >CHCN, —COOH, and

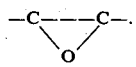

Such groups may be included as are mutually or self-crosslinkable, or added crosslinking compounds may be added, as is well known.

Generally, if used, such crosslinking monomers are present in amounts of from 0.05 to 20 percent, preferably from 0.5 to 5 percent by weight, based on the total monomers that form the coating resin.

The coating resins are prepared by methods which have long been conventional in the art.

The polymerization of vinyl monomer is suitably effected with the aid of a free radical initiator or catalyst, such as an organic or inorganic peroxide catalyst, persulfates, and the azo catalysts. From 0.1 percent to 3 percent or more of the initiator or catalyst may be used, based on the total weight of the monomers. To provide a high molecular weight, it is preferred to use from 0.1 percent to 1 percent of the initiator. Examples of organic peroxide catalysts that may be used include benzoyl peroxide, acetyl peroxide, caproyl peroxide, butyl perbenzoate, and butyl hydroperoxide. Examples of azo catalysts include azodiisobutyronitrile, azodiisobutyramide, dimethyl or diethyl or dibutyl azodiisobutyrate, azobis($\alpha$, $\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxide catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a solution of the polymer, or it may be that the polymer is precipitated from the solution, depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble, after which the suspension or slurry may be filtered or decanted and the polymer washed. Alternatively, the solvent may be distilled to leave the polymer. The emulsion, nonaqueous dispersion or the solution of the polymer, of course, can be used as such.

In the case of emulsion polymerization, examples of suitable nonionic emulsifiers include the higher alkyl phenoxypolyethoxyethanols in which the alkyl group has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)-trimethylammonium chloride, and so on.

Nonaqueous dispersions (NADs) are also useful in accordance with the present invention. Such dispersed polymers are prepared, for example, in accordance with Schmidle et al U.S. Pat. No. 3,232,903 and in that case relate to polymer dispersions in hydrocarbon liquids. The hydrocarbon may be of aliphatic character whether cyclic or acyclic, aromatic, or naphthenic. The polymerization takes place in the hydrocarbon liquid which is a nonsolvent for the polymer particles, and it contains an organic dispersing agent such as a hydrocarbon soluble acrylic polymer, oxidized vegetable oil or other known dispersing agent for nonaqueous dispersions. The monomers which are converted into dispersed polymers by the polymerization system of U.S. Pat. No. 3,232,903 may be selected from a wide variety of compounds such as the vinyl esters of fatty acids having from 1 to 18 carbon atoms including vinyl acetate, vinyl propionate, vinyl butyrate, vinyl laurate, vinyl oleate, and vinyl stearate. Esters of acrylic acid or of methacrylic acid with alcohols having from 1 to 18 carbon atoms may likewise be employed. Examples include methyl acrylate or methacrylate, isopropyl acrylate or methacrylate, ethyl acrylate or methacrylate, propyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylates. Acrylonitrile, methacrylonitrile, acrylamide, methacrylamide, styrene, $\alpha$-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate, hydroxyalkyl acrylates or methacrylates such as $\beta$-hydroxethyl methacrylate, $\beta$-hydroxyethyl vinyl ether, $\beta$-hydroxyethyl vinyl sulfide, vinyl pyrrolidone, N,N-dimethylaminoethyl methacrylate, ethylene, propylene, vinyl fluoride, vinylidene fluoride, hexafluoropropylene, tetrafluoroethylene, and so forth may also be used as the monomers for making the main polymer. Copolymers of the various monomers just mentioned and copolymers of any one or more of the above-mentioned monomers with up to 50 percent by weight of maleic anhydride may be formed by the system of the Schmidle et al patent.

Saturated or unsaturated polyesters are also useful and are prepared by conventional methods from the polyols and acids, examples being given below.

Examples of useful polymerizable unsaturated polybasic, preferably dibasic acids or their anhydrides and having less than about 36 carbon atoms, preferably having less than about 20 carbon atoms, are:

maleic
methylene glutaric
fumaric
itaconic
aconitic
citraconic
mesaconic
dilinoleic
monochloro maleic
dichloro maleic
hydromuconic
glutaconic or any other addition-polymerizable polybasic acid.

Representative saturated polybasic acids or aromatic polybasic acids, preferably the dibasic acids, or anhydrides thereof having no polymerizable double bonds are:

adipic
sebacic
suberic
azelaic
i-phthalic
o-phthalic
succinic
glutaric
1,1,3-trimethyl-5-carboxy-3-(p-carboxyphenyl)indan
malonic
pimelic
undecanedioic
terephthalic
naphthalic
diphenyl-o,o'-dicarboxylic
tetrachlorophthalic
tetrabromophthalic or any other dibasic acid free of polymerizable (i.e., olefinic) unsaturation, desirably having up to 20 carbon atoms.

Among the diols (or polyols) having no polymerizable double bond useful in preparing polyesters are polyols, glycols, or polyalkylene glycols such as:

ethylene glycol
1,3-butyleneglycol
1,4-butyleneglycol
neopentyl glycol
cyclohexanedimethanol
cyclobutanedimethanol
dipropylene glycol
1,5-pentanediol
trimethylolpropane
1,6-hexanediol
pentaerythritol
2,2'-bis(bromomethyl)1,3-propanediol
dipropylene glycol
2,2-dimethylpropanediol
2-ethyl-2-methylpropanediol
2-butyl-2-ethylpropanediol
diethylene glycol
propylene glycol
tetrapropylene glycol
glycerine and the like, the number of carbon atoms not being critical, with less than or more than 20 carbon atoms being useful.

The unsaturated or saturated polyester may be terminated with a monounsaturated monohydric alcohol having up to about 20 carbon atoms such as butene-1-ol-3, allyl alcohol, pentene-1-ol-3, methallyl alcohol, dodecene-1-ol-12, and the like, terminated with half esters of dibasic acids, such as maleic acid or fumaric acid, with alkanols having 1 to 20 carbon atoms such as methanol, butanol, octanol, dodecanol, and the like, terminated with a saturated monohydric alcohol having up to about 20 carbon atoms such as methanol, butanol, dodecapentanol, and the like, or terminated with a saturated or aromatic monobasic acid having up to about 20 carbon atoms such as acetic, propionic, dodecanoic, benzoic, and the like.

Unsaturated dihydric alcohols are useful to form unsaturated polyesters with polybasic acids which are not addition polymerizable and a polyol. Suitable unsaturated dihydric alcohols include butene diol, pentene diol, hexadecene diol, or any other addition polymerizable monounsaturated polyol, preferably a diol, having from 3 to about 20 carbon atoms.

Most preferably the coating resin polymer is saturated or becomes largely saturated by copolymerization with a suitable monomer such as styrene, and it is essential that the resin be one which is free of drying type unsaturation such as in linseed oil modified alkyds.

The aqueous coating compositions formed of the copolymers may be modified by the addition of a small proportion of certain water-soluble or self-dispersible urea-formaldehyde, N,N'-ethyleneurea-formaldehyde, and aminotriazine-formaldehyde condensates as well as an acidic catalyst. Thus, pentamethylol or hexa-methylol melamine or a methylated pentamethylol or hexa-methylol melamine condensate obtained by etherification with methyl alcohol may be used. The proportion of this type of condensate used is from one-twentieth to one-third of the weight of copolymer. Preferably, the condensate is employed at about 10 to 20 percent by weight of the copolymer. Note, for example, U.S. Pat Nos. 3,235,622 to Clemens et al, 3,261,788 to Carter et al, and 3,365,514 to Fisk et al.

The modified coating compositions may simply be obtained by the dissolution of the polyfunctional reagent, such as the urea-formaldehyde condensate, within the aqueous dispersion of the emulsion copolymer prepared as indicated above. In addition, an acidic catalyst is preferably also dissolved in the aqueous dispersion of the copolymer and condensate.

Examples of the acid catalysts are oxalic acid, ammonium phosphate, ammonium thiocyanate, boron trifluoride ethyl etherate, hydrochloric or other acid salts of a hydroxyaliphatic amine, including 2-methyl-2-aminopropanol, 2-methyl-2-amino-1,3-propanediol, tris(hydroxymethyl)aminomethane, 2-phenyl-2-amino-1-propanol, 2-methyl-2-amino-1-pentanol, 2-aminobutanol, triethanolamine, and 2-amino-2-ethyl-1-butanol, also ammonium chloride, pyridine hydrochloride, and benzyldimethylamine oxalate. The amine salts are water-soluble latent catalysts substantially neutral at ordinary temperature but dissociate into volatile components, one of which is acidic at the elevated temperatures used for baking and curing, so that the catalyst, after exerting its accelerating effect, is automatically discharged during the heating or curing stage.

In addition to the other ingredients, aqueous dispersions of the polymers of the present invention may contain a water-soluble thickening agent, such as gum tragacanth, water-soluble cellulose ethers, polyvinyl alcohol or partially saponified polyvinyl acetate, or copolymers of 30 to 60 percent of acrylic or methacrylic acid with 70 to 40 percent of ethyl or methyl acrylate. The aqueous dispersions may contain a mild alkali, for example, sodium acetate, sodium carbonate, morpholine, N-methylmorpholine, triethylamine, or ammonia, including, if desired, a mixture of water-soluble substances which form a conventional, mildly alkaline buffer. The proportions of the several ingredients in the aqueous dispersions can be varied widely, and they are adjusted in any convenient manner so that the dispersions or pastes have a consistency suitable for application by the particular technique to be employed for this purpose. Normally the pH of the coating composition is adjusted.

The compositions may be applied to the substrates in any suitable manner such as by spraying, brushing, rollercoating, dipping, knife-coating, and so on. Excess of the applied material may be wiped by any suitable squeegeeing operation such as between pressure rollers, by air squeegeeing, or by a knife or doctor blade. Thereafter, the coating may be dried and cured. Besides simple air-drying, there may be employed for this purpose heated air as in an oven or tunnel drier, radiation such as by infrared lamps and/or ultraviolet lamps or electrical induction fields. The baking or curing operation may be accomplished by the use of any suitable heating devices such as infrared lamps or electromagnetic or electrostatic high frequency induction devices.

Another desirable ancillary component which is preferentially present in the aqueous dispersion composition is a volatile water-soluble organic anti-freeze agent to provide the aqueous paint with freeze-thaw stability. Ethylene glycol is especially useful for this purpose at concentrations up to about 5 percent by weight of the total composition. Other glycols and polyglycols can be used for this purpose.

If the addition polymer is initially prepared by emulsion polymerization using an anionic emulsifier exclusively, it may be desirable to add a nonionic emulsifier to the polymer dispersion to stabilize the same. Generally, about 0.1 to 5 percent of nonionic surfactant is adequate.

Aqueous dispersion compositions containing surfactants ordinarily foam unless selection of the dispersants is specifically directed to the inherently non-foaming species. Anti-foam agents are ordinarily included in the formulation to minimize foaming. High boiling alcohols, polyglycols, silicone liquids and other anti-foam agents well known to the coating art can be included in the composition as an ancillary component.

As with conventional paints and enamels formulated from drying oils and from alkyd resins, the varnish or lacquer coalesced from the invention composition may exhibit fungus attack and, therefore, it is further desirable to include a preservative or fungicidal agent in the paint. Any of the well-known preservative agents used in paint formulations can be used in their usual small effective proportions. Phenyl mercury oleate and other phenyl mercurial fungicides are especially useful at active concentrations from 0.05 to 0.3 percent by weight of the composition.

The varnish or lacquer compositions of this invention ordinarily are adequately flexible so that the external plasticization of the polymer binder is unnecessary. However, ancillary plasticizer can be included in the composition in a minor proportion up to 25 percent by weight of the polymer binder, preferably no more than 10 percent. Non-volatile ester plasticizers, for example, the phosphates, such as tricresyl phosphate, and the phthalates, such as dibutyl phthalate, or the polymeric polyester or alkyd plasticizers can be used.

While the total non-volatile content of the aqueous dispersion composition, ordinarily designated as the solids content, can vary widely, it is desirable that the non-volatile content be at least 30 percent by weight in order that a practical amount of the material per coat is applied. The aqueous varnish or lacquer can be satisfactorily formulated in a non-volatile content as great at 70 percent, but at this concentration thinning, as with water, is ordinarily necessary for satisfactory application. The preferred non-volatile content is from about 40 percent to 60 percent by weight.

The viscosity of the aqueous dispersion composition also can be varied widely. A Stormer viscosity of about 70 to 100 K.U. at 25° C. is a desirable ready-to-apply brush consistency. This is not a critical characteristic as the varnish or lacquer can be further modified satisfactorily with thixotropy controlling agents to provide the composition with non-drip characteristics and with adequate brush-out characteristics.

Other auxiliary materials that may be used include: dispersing agents for dispersing and maintaining in a finely divided state tinting colors, such as aromatic sulfonates condensed with formaldehyde or any of the suitable commercial dispersing agents which are available for this purpose, sequestering agents for controlling polyvalent metal ions sometimes introduced, such as complex alkali metal phosphates or ethylene polyaminoacetates, defoaming agents, including waxes, oils, or mineral spirits, or an alkylphenoxyethanol, fatty acid amides, phosphate esters, or a solution of an amine or amine in an oil; humectants, such as water-soluble gums, ammonium or sodium polyacrylate, glycol laurate, propylene glycol, diethylene glycol, etc.; thickeners, such as water-soluble gums, water-soluble polyacrylates and methacrylates, water-dispersed starches and proteins, etc.; bactericides and/or fungicides, such as borax, pentachlorophenols, or mercury compounds; perfume-like materials, including neutralizing and masking agents, which are used to overcome odors or to impart pleasant and distinctive odors; other resinous materials in dispersed form, and auxiliary corrosion-inhibiting agents, such as sodium benzoate, sodium dichromate, guanyl urea phosphate, or sodium nitrate, in an amount of 0.05 percent to 8 percent, and most commonly 0.5 percent to 4 percent of the dispersed copolymer, etc.

Another group of auxiliary materials that may be used are the conventional ultraviolet light absorbers. Under severe exposure conditions, it may be desirable to fortify the phenol-formaldehyde resins of this disclosure with conventional ultraviolet light absorbers, in an amount of 0.05 percent to 8 percent and most commonly 0.5 percent to 4 percent of the combined weight of coating resin and phenol-formaldehyde resin. Typical absorbers are 2,2'-dihydroxy-4,4'-dimethoxy benzophenone, 2(2'-hydroxy-5'-methylphenyl)benzotriazole, 2-hydroxy-4-n-octoxybenzophenone, 2-ethoxyethyl-p-methoxy cinnamate, ethyl-2-cyano-3,3-diphenyl acrylate, 2,4-dihydroxy benzophenone, and 2-hydroxy-4-methoxy benzophenone.

As was indicated above, the compositions of the present invention may be of strictly thermoplastic character or they may be of thermosetting character. The compositions may comprise auxiliary components which impart thermosetting qualities thereto. For example, there may be added an aldehyde, such as formaldehyde, an aminoplast or phenoplast, such as the resin-forming condensates of formaldehyde with phenol, (or with urea, N,N'-ethyleneurea, 5-alkyl- or 5-hydroxyethyltriazones, aminotriazones, such as melamine, as well as the methylated derivatives of these condensates, as discussed above), poly(vic-epoxides) of aliphatic types, alkyd resins, i.e., polyesters of polycarboxylic acids (e.g., phthalic, adipic, or sebacic) with a polyol (e.g., ethylene glycol, glycerol, trimethylolethane). The content of these auxiliary materials may be from 1 percent to 35 percent by weight of the total weight of vinyl addition polymeric binder material.

When the thermosetting forms of the compositions of the present invention are used, the coating or impregnation may simply be dried at room temperature or whatever exterior temperature may prevail at the time as would be done with the simple thermoplastic types, reliance for development of cure being placed upon ageing for an extended period of time, e.g., several days, weeks, or in some cases, months. On the other hand, the cure of such films may be hastened by drying at elevated temperatures or heating at elevated temperatures (up to 200° C.) for several minutes to a half-hour after drying at room temperatures.

Similar additives are useful in the nonaqueous compositions. In all of the examples, the para-substituted phenol-formaldehyde condensate is linear and thermoplastic, with the methylene groups being in the ortho, ortho' position with respect to the hydroxyl.

EXAMPLE 1

An acrylic solution polymer containing 68 parts methyl methacrylate, 30 parts ethyl acrylate, and 2 part methacrylic acid by weight, at a concentration of 40 percent solids in toluol is used in this example. A coating of this polymer is transparent in the ultraviolet region of sunlight.

An alkali catalyzed p-octylphenol-formaldehyde condensate reacted in the mole ratio of about 1 to 4 and having a number average molecular weight of about 1000, is dissolved in Cellosolve acetate at a solids concentration of about 50 percent. The two are blended to give compositions having an acrylic resin/phenolic resin weight ratio of 90/10 and 95/5. The films are cast on glass plates to give approximately 2 mil thick dry films, and after drying in air, they are heated at 250°F. for 2 hours to remove any remaining solvent.

Essentially the same blend is made but with a nonreactive p-octylphenol-formaldehyde condensate prepared with an acid catalyst, the mole ratio of octylphenol to formaldehyde being about 1 to 2.75, and having a molecular weight of about 800.

The supported films are exposed on a Weather-O-Meter (Atlas Electric Devices Company, Chicago, Model 600-WR) for increasing periods of time, a portion of the film being removed after each interval for determination of the UV spectrum.

In the following table, the absorbance is given and is computed according to the following formula:

$$\text{absorbance} = \log_{10} \frac{100}{\% \text{ transmittance}}$$

Thus the following comparison gives the equivalency of absorbance and percent transmittance.

| Absorbance of UV | Percent Transmittance of UV |
|---|---|
| 0 | 100 |
| 0.5 | 32 |
| 1.0 | 10 |
| 1.5 | 3.2 |

| Phenolic Type | Acrylic Phenolic (weight ratio solids) | Absorbance at 350 millimicrons* (approx. middle of sunlight UV) Hours Weather-O-Meter Exposures | | | |
|---|---|---|---|---|---|
| | | 0 | 68 | 146 | 475 |
| None | 100/0 | 0.00 | 0.00 | 0.00 | 0.00 |
| Reactive | 95/5 | 0.01 | 0.46 | 0.51 | 0.63 |
| | 90/10 | 0.04 | 1.13 | 1.3 | >1.5 |
| Nonreactive | 95/5 | 0.00 | 0.21 | 0.27 | 0.61 |
| | 90/10 | 0.00 | 0.32 | 0.52 | >1.5 |

*Absorbance corrected for unmodified acrylic absorbance which does not change even after 1000 hours exposure.

It may be seen that the phenolic resins, before exposure to the weathering elements, contribute little ultraviolet absorption (UVA); but this develops upon exposure to significant levels for each of the types of phenolic resins. This is supported by the infrared spectra changes of samples of the coatings after exposures of 0.78, 170, and 405 hours of exposure in the Weather-O-Meter. It is observed that in the spectrum there is a development of an absorption peak at about 6 microns, the strength of which increases with exposure time. Absorption in the 6 micron region is characteristic of carbonyl structures, reinforcing the hypothesis given above that the methyl groups are converted to carbonyl groups. It has been established that the development of an absorption peak at about 6 microns is not caused by an increase in carboxylic acid content by noting that the acid number does not increase with increasing exposure time.

EXAMPLE 2

An emulsion copolymer latex of about 48 parts methyl methacrylate, 2 parts methacrylic acid, and 50 parts of butyl acrylate by weight, neutralized with ammonia and having a solids content of 50 percent is mixed with the reactive p-octylphenol-formaldehyde condensate of Example 1. This is done by premixing the phenolic resin with butyl Cellosolve and aqueous ammonia (28 percent concentration) in a 20/80/2 weight ratio. The above solution is then added to the latex with stirring together with sufficient water to maintain a workable viscosity. Samples containing no phenolic, 10 percent of the phenolic, and 20 percent of the phenolic, by weight, are used.

The films are cast from the mixture to provide about 2 mil thick dry films on glass plates which are dried and then heated at 250° F. for 2 hours to volatilize the solvents.

Exposures are made in the Weather-O-Meter as in Example 1 and at Newtown, Pennsylvania, facing south at 45° inclination. Portions of the film are removed at intervals for determining UVA.

The acrylic/phenolic system is compared with a commercial ultraviolet absorber with the following results:

| System | | Absorbance at 350 millimicrons | | | | | | |
|---|---|---|---|---|---|---|---|---|
| | | Hours Weather-O-Meter Exposure | | | | Days Newtown Exposure | | |
| | | 0 | 211 | 521 | 1021 | 0 | 75 | 150 |
| Acrylic/Phenolic = | 100/0 | 0.2 | 0.2 | 0.2 | 0.2 | 0.2 | 0.2 | 0.3 |
| | 90/10 | 0.3 | 1.1 | 1.2 | 1.0 | 0.3 | 1.0 | 1.0 |
| | 80/20 | 0.4 | 1.9 | 2.2 | 2.4 | 0.4 | 1.7 | 1.9 |
| UV-490*, 2 percent on acrylic solids | | 2.0 | 1.9 | 0.9 | 0.4 | 2.0 | 2.0 | 2.0 |

*Uvinul 490 is a UV absorber from GAF Corporation that is described as a mixture of tetra substituted hydroxy benzophenones, with the principal component being 2,2'-dihydroxy-4,4'-dimethoxy benzophenone.

| Coating | Observation |
|---|---|
| Acrylic/phenolic = 80/20 | No bleaching evident. Light surface dirt. Slight loss of gloss. |
| UV-490, 2 percent on acrylic | No bleaching evident but surface very dirty. Dull appearance. |
| Commercial spar varnish A (tung oil, phenolic, linseed oil, silicone) | Original glossy finish is nearly flat as if eroded, and consequently coating has lost transparency. |
| Commercial spar varnish B (tung oil, phenolic, soya alkyd) | Noticeable loss of gloss and coating has small cracks throughout surface. No bleaching but heavy surface dirt. |

It is apparent that the phenolic-modified film develops UVA at a significant rate on exterior exposure as well as in the Weather-O-Meter as shown in Example 1. Weather-O-Meter results show a decline of absorbance of ultraviolet with increasing exposure for the commercial ultraviolet screening material, perhaps because of leaching of this low molecular weight material. Insufficient time has elasped at Newtown to demonstrate that effect for the reason that 150 days at Newtown appears to correspond only to about 211 hours in the Weather-O-Meter.

EXAMPLE 3

The purpose of this example is to illustrate that substantial protection is afforded by the varnish or lacquer film to substrates which are sensitive to ultraviolet light and are deteriorated by exterior weathering. The substrates in this case are unweathered cedar siding boards which are coated with the three coats of the varnish to yield about 4 mil dry films and exposed for 6 months in Miami, Florida, facing south at an angle of 45° to get the harshest conditions of exposure to sunlight and weathering as are possible.

The acrylic latex/phenolics are the same as in Example 2, that is, the same emulsion polymers and other clear coating components are utilized, including the same emulsions with the commercial ultraviolet screening agent as in Example 2, as well as two commercial varnishes. One is a commercial varnish from a large mail order house which also has retail outlets, the other spar varnish being a marine varnish produced by a Philadelphia company. The results are as follows:

| Coating | Observation |
|---|---|
| No coating | Fissures along grain. Heavily bleached (graying) in soft grain. A charred appearance. |
| Acrylic/phenolic = 100/0 | Coating has good integrity, but noticeable bleaching of wood beneath. Surface moderately dirty. Surface rather dull |
| Acrylic/phenolic = 90/10 | No bleaching evident. Surface dirt light to moderate. Moderate loss of gloss. |

Surprisingly, the acrylic latices provide coatings that significantly outperform the earlier resinous-phenolic spar varnishes. Even though the latter contained phenolic resins, the drying oil type of unsaturation in the varnishes appear to cause sufficient degradation that undesirable results are achieved.

EXAMPLE 4

The previous examples show that UVA can be developed in the phenolics upon exposure to sunlight or other oxidation inducing and destructive mechanisms. Thus while the coating composition develops UVA upon exposure to sunlight or ultraviolet light, in order to provide maximum initial effectiveness, the phenol-aldehyde condensate can be oxidized prior to forming the coating composition, or prior to exposing the dried coating to conditions which provide oxidation of the phenolic.

The reactive and nonreactive octylphenol-formaldehyde condensates of Example 1, as well as a similar p-butylphenol reacted with formaldehyde under acid conditions to give a nonreactive material, are used. Solutions of the phenolics by themselves are prepared in butyl Cellosolve/acetone in a ½ weight ratio and cast on glass to yield approximately 5 mil thick dry films. The films are baked in air for various periods of time at 250°F. Solutions are made by redissolving the baked samples for ultraviolet spectral determinations, the first two phenolics being redissolved in iso-octane and the third one in dioxane.

The results are as follows:

| | Absorbance at 350 millimicrons (0.1 percent solutions in 1 cm. cell vs. solvent) | | | | |
|---|---|---|---|---|---|
| | Hours at 250° F. in Air Oven | | | | |
| | 0 | 20 | 40 | 80 | 160 |
| Reactive octylphenol-formaldehyde (in iso-octane) | 0.4 | 1.4 | 2.6 | 3.8 | 4.4 |
| Nonreactive octylphenol-formaldehyde (in iso-octane) | 0.0 | 0.3 | 0.6 | 2.7 | 4.1 |
| Nonreactive para-t-butyl-formaldehyde (in dioxane) | 0.1 | 0.7 | 1.8 | 5.0 | 7.6 |

This establishes that initial UVA properties can be improved by oxidizing the linear substituted phenol-aldehyde resins before combining them with the hard coating resin.

EXAMPLE 5

Similar results are obtained when oxidation promoters such as a manganese drier or t-butylperacetate (t-BPA) are incorporated in the phenolics whereas when hydroquinone (HQ) is used and when a nitrogen atmosphere is used during baking, absorbance is inhibited, In the following table, absorbance is placed side by side with the percent transmittance to emphasize the improvement of utilizing an oxidation promoter to increase the rate of oxidation of the phenol-aldehyde resin.

| Treatment and/or Additive | Absorbance (Percent Transmittance) at 350 millimicrons (0.1 weight percent solutions versus solvent, 1 cm.) | | | |
|---|---|---|---|---|
| | Reactive Octylphenol-Formaldehyde | | Nonreactive Para-t-butylphenol-Formaldehyde | |
| | Baked* | Air Dried | Baked | Air Dried |
| None (in air) | 0.94(12) | 0.27(54) | 0.69(20) | 0.05(90) |
| N$_2$ atmosphere ⎫ | 0.80(16) | | 0.18(66) | |
| 0.5% HQ (in air)  Retarders** | 0.88(13) | | 0.64(23) | |
| 0.5% HQ (in N$_2$) ⎭ | 0.40(40) | | 0.05(89) | |
| 0.1% Mn (in air) ⎫ Promoters | 4.89(*10$^{-3}$) | | 2.28(***0.5) | |
| 0.5% t-BPA (in air) ⎭ | 0.99(10) | | 0.76(17) | |

*conditions were 250°F. for 16 hours.
**amounts based on weight of phenol-formaldehyde condensate. Mn calculated as metal, but introduced as naphthenate.
***approximate values.

It is concluded that nitrogen, HQ inhibitor and particularly the combination, are effective in retarding UVA development under external oxidizing conditions. HQ in air alone may be so rapidly consumed that it is ineffective, yet greatly aids in scavenging small amounts of residual oxygen in the case where an N$_2$ purge was used. Mn is highly effective in promoting UVA development, but t-BPA is only slightly effective here.

EXAMPLE 6

Fluorescent paints are quite susceptible to exposure to sunlight and commonly lose their fluorescent qualities upon outside exposure. The phenol-aldehyde product is the reactive p-octylphenol-formaldehyde condensate of Example 1. One portion of the linear phenolic material is used without preoxidation while the other one was preoxidized by baking a 5 mil thick film at 250°F. in air for 16 hours. The formulations, using a free radical initiated acrylic solution polymer of about 60 percent butyl acrylate, 39 percent methyl methacrylate, and 1.0 percent methacrylic acid, are as follows:

| Ingredient | Parts by Weight | | | | |
|---|---|---|---|---|---|
| | A | B | C | D | E |
| Acrylic (40 percent in toluol) | 19.4 | 18.4 | 15.5 | 17.5 | 15.5 |
| Toluol | 0.6 | 1.2 | 1.9 | 1.2 | 1.9 |
| Uvinul D-49* (100 percent) | — | 0.4 | — | — | — |

Continued

| Ingredient | Parts by Weight | | | | |
|---|---|---|---|---|---|
| | A | B | C | D | E |
| Reactive phenolic: as-is | — | — | — | — | 2.6 |
| Reactive phenolic: 5 mil, 250°F./16 hours (pre-oxidized) | — | — | 2.6 | 1.3 | — |
| Weight percent additive, solids basis | 0 | 5.2 | 20 | 10 | 20 |

*2,2'-dihydroxy-4,4'-dimethoxy benzophenone, 5 percent toluene soluble as per MIL-P-21600

The acrylic resin is highly transparent to the ultraviolet in the region as received from sunlight.

A red fluorescent pigmented acrylic lacquer is applied over titanium dioxide white acrylic lacquer base coat, the latter purportedly rendering a brighter fluorescent effect. Top coat formulations made up as noted above, at about 39 percent solids by weight, are applied thereover.

When these formulations are cast over the fluorescent paint to give 1 mil thick dry films and subsequently exposed in a Fade-O-Meter (Atlas Electric Devices, Chicago, Type FDA-R) along with a sample having no top coat, the time of exposure being 1.1 hours, the results are as follows:

| Topcoat Formulation | Observation |
|---|---|
| No topcoat | Strong darkening of fluorescent coat |
| A) No additive | Strong darkening |
| B) 5.2% Uvinul D-49 | Very slight darkening |
| C) 20% reactive phenolic (pre-heated) | Slight darkening |
| D) 10% reactive phenolic (pre-heated) | Slight — modest darkening |
| E) 20% reactive phenolic (as-is) | Modest — strong darkening |

It can be seen that the pre-heated phenolic has a substantial effect on preventing darkening of the fluorescent coat, whereas the previously unoxidized product apparently does not develop its UVA properties quickly enough to most effectively protect especially sensitive substrates.

As is known to those skilled in the art, the Weather-O-Meter and Fade-O-Meter subject speciments treated therein to conditions analogous to weathering out of doors and to exposure to sunlight, but under much accelerated conditions.

We claim:

1. A process of coating a substrate with a transparent, weather-resistant, light-stable exterior varnish comprising oxidizing a transparent, water-insoluble linear phenolformaldehyde condensate, under conditions such that oxidation of the phenol-formaldehyde condensate is achieved to an extent such that at least some fo the —CH$_2$— groups connected to phenol rings are converted to

groups, the phenol having the formula:

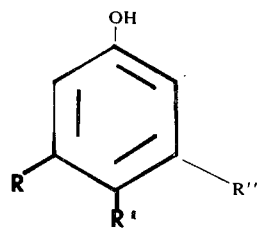

wherein R' is a radical selected from the group consisting of alkyl, substituted alkyl, cycloalkyl, substituted cycloalkyl, aryl, and substituted aryl, and R and R'' are radicals taken from said group or H, the methylene groups in the condensation resin being in the ortho, ortho' position with respect to the hydroxyl group, said linear oxidized condensate having the partial structure:

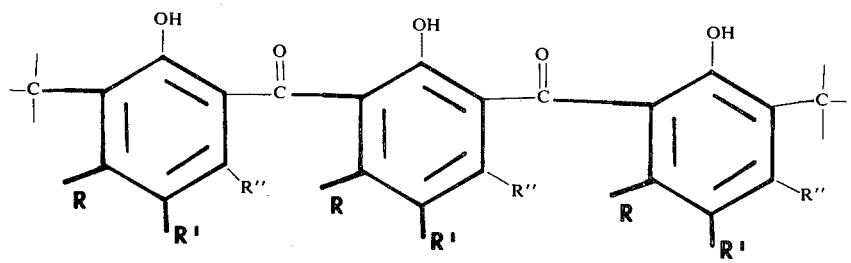

blending it with a transparent varnish or lacquer coating resin, free of drying types of unsaturation and free of chlorine and bromine, and applying a thin coating of the transparent composition to the substrate whereby the oxidized phenol-formaldehyde condensate protects the coating resin from oxidation induced by actinic light or other means, the oxidation being accomplished either before or after the blending step, and is achieved before the coating step, the amount of condensation resin being from 5 percent to 35 percent based on the combined weights of the resins.

2. The process of claim 1 in which the coating resin is dispersed as fine particles in an organic liquid which is a nonsolvent for the resin.

3. The process of claim 1 in which the coating resin is dispersed in an aqueous medium in the form of a latex.

4. The process of claim 1 in which the materials are dissolved in an organic solvent.

5. The process of colaim 3 in which the coating resin is a copolymer of an acrylic acid ester or a methacrylic acid ester and another unsaturated copolymerizable compound, R and R'' are H, and R' is alkyl having from 1 to 20 carbon atoms.

6. The process of claim 1 in which the substrate is wood.

7. The process of claim 1 in which the transparent coating resin is a thermoplastic resin selected from at least one of the non-drying alkyds; cellulose esters, including cellulose acetate butyrate, cellulose acetate, and cellulose acetate propionate; nylons, including nylon 11 and nylon 12; epoxies, including the epoxy acrylates; polysulfides; acetal polymers; polycarbonates; polysulfones; polyimides; silicones, including the polymer having repeating dimethyl silicone units; polyolefins, including polyethylene, polystyrene, and polypropylene; hard or soft acrylics including copolymers of methyl methacrylate with another ethylenically unsaturated monomer, including acrylic acid, methacrylic acid, or another acrylic acid or methacrylic acid ester; polyhalo-olefins, including polyvinylfluoride, polyvinylfluoride-polyvinylacetate, polyvinylfluoride-polyvinylidene fluoride, and a copolymer of vinyl fluoride and vinyl butyral; and polyesters including polyethylene terephthalate, the unsaturated polyester derived from maleic anhydride, phthalic anhydride, and ethylene glycol, and said unsaturated polyesters reacted with styrene.

8. The process of claim 7 in which the coating resin is an addition polymer of vinyl monomers.

9. The process of claim 1 in which the phenol formaldehyde condensate is combined with a metallic drier whereby the oxidation of the phenol formaldehyde condensate is accelerated.

* * * * *

UNITED STATES PATENT OFFICE
CERTIFICATE OF CORRECTION

PATENT NO. : 3,914,463
DATED : October 21, 1975
INVENTOR(S) : A. Mercurio, P.R. Sperry It is certified that error appears in the above-identified patent and that said Letters Patent are hereby corrected as shown below:

Column 2, the formula starting after line 37, in the last two rings:

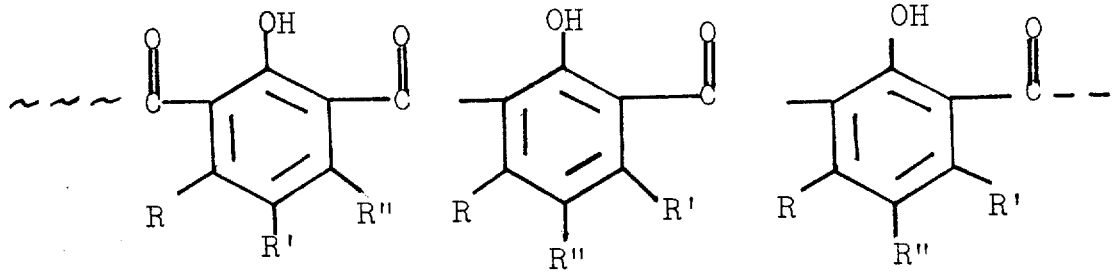

should be

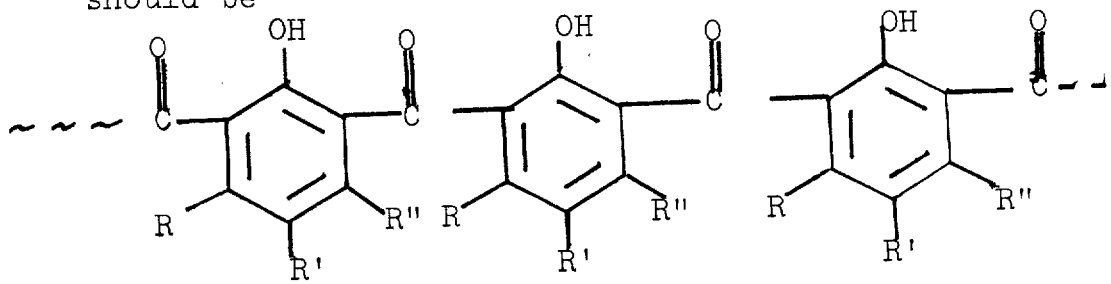

Column 3, line 58 "para" should be --para--.
Column 3, line 64 "substitutent" should be --substituent--.
Column 6, line 33 "methyacrylic" should be --methacrylic--.
Column 6, line 44 "ether vinyl ether" should be --ethyl vinyl ether--.
Column 6, line 58 "quanamines" should be --guanamines--.
Column 7, line 45 "acrylte" should be --acrylate--.
Column 7, line 56 "had" should be --hard--.

Signed and Sealed this tenth Day of February 1976

[SEAL]

Attest:

RUTH C. MASON
Attesting Officer

C. MARSHALL DANN
Commissioner of Patents and Trademarks